US011034350B2

(12) United States Patent
Hoedt et al.

(10) Patent No.: US 11,034,350 B2
(45) Date of Patent: Jun. 15, 2021

(54) METHOD FOR ADAPTING A PREDETERMINED REFERENCE LINE FOR A TRANSPORTATION VEHICLE AND DEVICE

(71) Applicant: VOLKSWAGEN AKTIENGESELLSCHAFT, Wolfsburg (DE)

(72) Inventors: Jens Hoedt, Hannover (DE); Björn Mennenga, Dresden (DE); Felix Kallmeyer, Wolfsburg (DE)

(73) Assignee: Volkswagen Aktiengesellschaft

( * ) Notice: Subject to any disclaimer, the term of this patent is extended or adjusted under 35 U.S.C. 154(b) by 408 days.

(21) Appl. No.: 16/181,736

(22) Filed: Nov. 6, 2018

(65) Prior Publication Data
US 2019/0143974 A1    May 16, 2019

(30) Foreign Application Priority Data
Nov. 16, 2017   (DE) ..................... 10 2017 220 486.9

(51) Int. Cl.
*B60W 30/18* (2012.01)
*G05D 1/00* (2006.01)
(52) U.S. Cl.
CPC ........... *B60W 30/18* (2013.01); *G05D 1/0088* (2013.01); *B60W 2540/215* (2020.02);
(Continued)
(58) Field of Classification Search
CPC ........... B60W 30/18; B60W 2540/215; B60W 2555/00; B60W 2555/20; B60W 2555/60;
(Continued)

(56) References Cited

U.S. PATENT DOCUMENTS

| 6,185,492 B1 * | 2/2001 | Kagawa | B62D 15/025 701/41 |
| 8,977,419 B2 * | 3/2015 | Lee | B62D 1/28 701/23 |

(Continued)

FOREIGN PATENT DOCUMENTS

| DE | 10218010 A1 | 11/2003 |
| DE | 10255719 A1 | 7/2004 |

(Continued)

OTHER PUBLICATIONS

English Translation DE10255719A1.*
Search Report for German Patent Application No. 10 2017 220 486.9; dated May 29, 2018.

*Primary Examiner* — Rami Khatib
(74) *Attorney, Agent, or Firm* — Barnes & Thornburg LLP

(57) ABSTRACT

A method for adapting a predefined reference line for a transportation vehicle, a device, and a transportation vehicle. A predefined reference line is received by a control unit. A distance value of a maximum lateral distance from the predefined reference line is received by the control unit from an input device and a permissible area is specified that extends along the reference line and the lateral boundary of which is the maximum distance from the reference line that is specified by the distance value. A driving path optimized for a minimum driving time is calculated by a specified first mathematical optimization method starting from the current transportation vehicle position. The first mathematical optimization method has at least one boundary condition that requires a course of the driving path within the permissible area. The distance value is specified by a user input by the input device.

16 Claims, 2 Drawing Sheets

(52) U.S. Cl.
CPC ..... *B60W 2555/00* (2020.02); *B60W 2555/20* (2020.02); *B60W 2555/60* (2020.02); *B60W 2720/125* (2013.01)

(58) Field of Classification Search
CPC ... B60W 2720/125; B60W 2050/0028; B60W 2540/30; B60W 30/10; G05D 1/0088
See application file for complete search history.

(56) References Cited

U.S. PATENT DOCUMENTS

| | | | | |
|---|---|---|---|---|
| 8,977,464 | B1* | 3/2015 | Takahashi | B60W 30/045 701/70 |
| 2005/0228588 | A1* | 10/2005 | Braeuchle | B60W 30/12 701/301 |
| 2012/0035792 | A1* | 2/2012 | Dolpp | B60W 50/085 701/22 |
| 2013/0006473 | A1* | 1/2013 | Buerkle | B60W 30/18145 701/41 |
| 2015/0348418 | A1* | 12/2015 | Pfeiffer | B60W 50/14 340/435 |
| 2016/0052547 | A1* | 2/2016 | Kashiwai | B60W 40/076 701/41 |
| 2016/0264136 | A1* | 9/2016 | Minoiu Enache | B60W 30/02 |
| 2016/0368534 | A1* | 12/2016 | Harda | H04N 7/181 |

FOREIGN PATENT DOCUMENTS

| | | |
|---|---|---|
| DE | 102009047476 A1 | 6/2011 |
| DE | 02013203819 A1 | 9/2014 |
| DE | 102015216817 A1 | 3/2017 |

* cited by examiner

METHOD FOR ADAPTING A PREDETERMINED REFERENCE LINE FOR A TRANSPORTATION VEHICLE AND DEVICE

PRIORITY CLAIM

This patent application claims priority to German Patent Application No. 10 2017 220 486.9, filed 16 Nov. 2017, the disclosure of which is incorporated herein by reference in its entirety.

SUMMARY

Illustrative embodiments relate to a method for adapting a predefined reference line for a transportation vehicle and a device.

BRIEF DESCRIPTION OF THE DRAWINGS

An exemplary embodiment is described below. In the figures.

DETAILED DESCRIPTION

Figure 1:
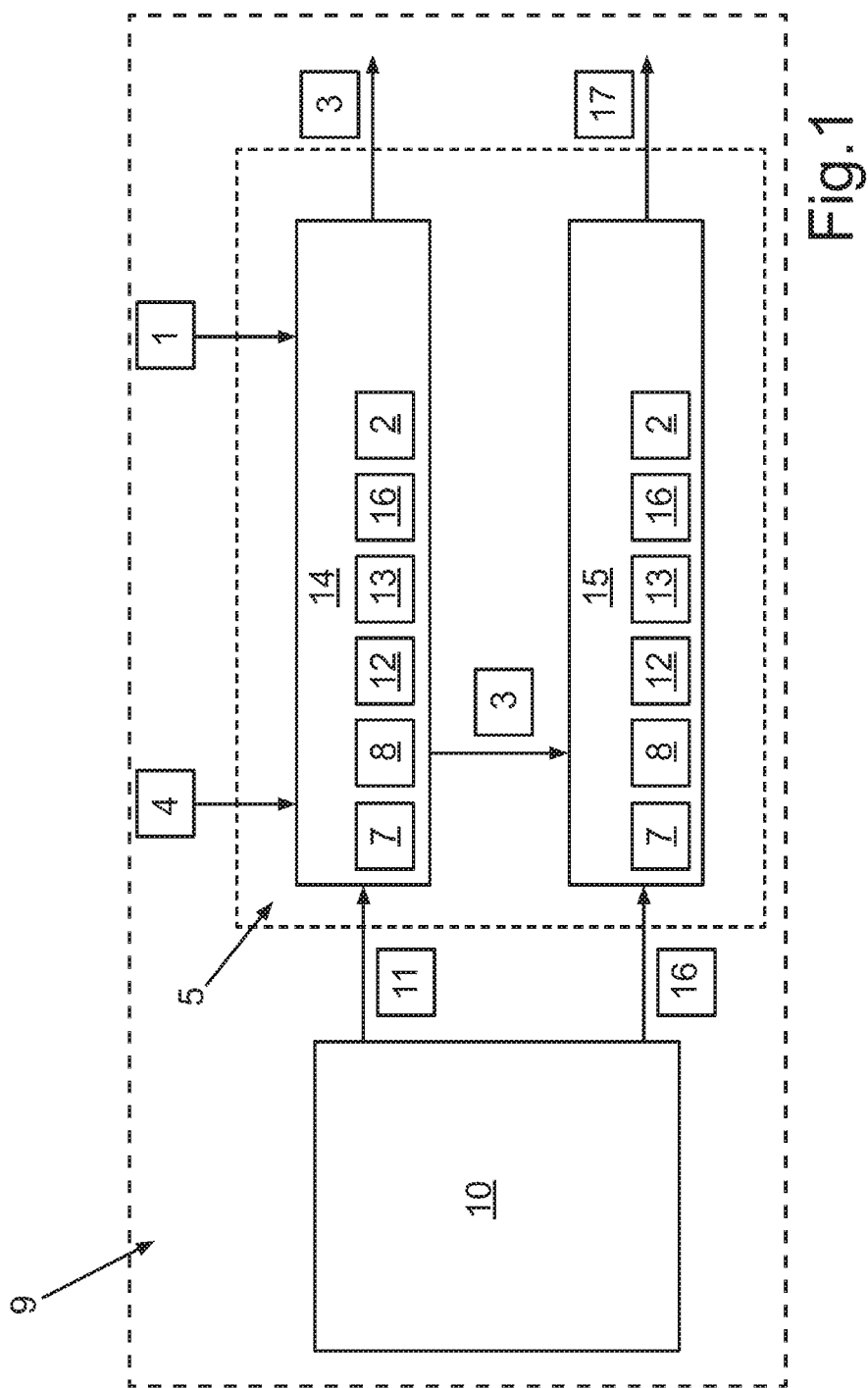
FIG. 1 shows a flow chart of a disclosed method.

In the field of automatic driving, reference lines are used to follow a desired path using trajectory control. As a rule, a center line of the desired lane is selected as the reference line. A speed profile is determined for the reference line that is followed by the autopilot. When using a reference line that is oriented solely to the course of a lane, it is a drawback that the driving dynamics of the transportation vehicle are not incorporated in determining the reference line and travelling along the reference line determined in this way can be perceived by transportation vehicle occupants as uncomfortable.

To counteract this, it is known, for example, to adjust individual sections of the reference line by purely geometric optimization. The driving line to be followed is then composed of individual sections. Also in this case, the dynamics of the transportation vehicle are not incorporated. The requirements on the reference line can also be dependent on a respective driver of the transportation vehicle and thus can vary. Thus, either a sporty driving behavior or a defensive driving behavior can be desired by a driver. According to the prior art, it is usual in this case to select a driving profile that describes a specified driving behavior by a set of parameters. As a rule, the driving profiles comprise parameters that can be neither clearly nor easily adapted for a driver. Thus, it is not possible for a driver to vary the driving behavior in a simple and clear manner. In addition, continuous variation of the driving behavior is not possible, since the driving behavior is associated with predefined color profiles.

In DE 10 2009 047 476 A1, a method and a control unit for determining a trajectory of part of a section of a turn of a road are described. In this case, it is provided that a trajectory of a section followed by a transportation vehicle is calculated that intersects a course of a center line in a turn. In this case, the trajectory of a section comprises a lesser curvature than the course of the center line. In the context of the method, it is possible to set geometric parameters that influence the course of the trajectory of a section. In the context of the method, the trajectory of a section is not calculated for a complete section but for a section of a turn. A sequence of turn sections thus necessitates the sequencing of individual section trajectories, each of which is individually generated.

Disclosed embodiments provide a possibility that enables a driver to adapt a reference line according to easily understandable parameters.

Disclosed embodiments provide a method for adapting a predefined reference line for a transportation vehicle, wherein the predefined reference line is received by a control unit. The reference line is a local course of an original driving path, which is used in the context of the method as the basis for calculating a driving path. In this case, it can be a reference line that is provided by a device of the transportation vehicle and that extends along a road. The driving path describes a local course that is to be followed by the transportation vehicle. The control unit can be a microcontroller and/or a microprocessor. The control unit can receive a distance value for a maximum lateral distance from the predefined reference line from an input device. The distance value is a value that describes a maximum lateral difference between the driving path to be determined and the reference line. The input device is a device that is arranged to detect a user input. In this case, it can be a touch screen, for example. The distance value of the maximum lateral distance is specified by a user input by the input device.

From the reference line and the distance value, the control unit determines a permissible area that extends along the reference line, the lateral boundary of which is at the maximum distance, which is defined by the distance value, from the reference line, wherein the lateral boundary can be different from the lane boundary. The permissible area represents an area within which the driving path to be calculated extends. The driving path for the transportation vehicle is calculated by a specified first mathematical optimization method, wherein starting from a current transportation vehicle position, the driving path is optimized to a minimum driving time by the first mathematical optimization method. The first mathematical optimization method comprises at least one boundary condition that requires a course of the driving path within the permissible area. The first optimization method can, for example, be a minimization method that specifies the driving path while complying with the specified conditions so that the driving path has the minimum driving time that is possible for a course within the permissible area. The driving path thus represents the time-optimal trajectory for a specified speed. For the first mathematical optimization method, in particular, interior-point methods or collocation methods are considered, wherein the first mathematical optimization method basically comprises a measure of quality that ensures the time-optimal course of the driving path. It also comprises a nonlinear mathematical driving dynamics model of the transportation vehicle that ensures compliance with the physical limits.

In other words, the method enables the time-optimal driving path to be determined that extends along the reference line. In this case, the driving path extends within a permissible area defined by the reference line and a distance value from the predefined reference line. The distance value can be adjusted by a user input by an input device. The permissible area extends along the reference line and is bounded by two boundary lines that are at a respective lateral distance from the reference line defined by the distance value. The calculation of the driving path by the control unit is carried out in this case by a first mathematical optimization method that determines a time-optimized driving path.

Based on the driving path, an autopilot can now control the transportation vehicle. This can be carried out by trajectory control, for example.

Disclosed embodiments provide that a predefined reference line is driving-dynamically adapted to a driving path, wherein a driver can adapt the driving path comprehensibly by the distance value.

Thus, for example, it is possible that the distance value can be specified by an input device, such as a regulator. In this case, the input device can be arranged such that the distance value can adopt at least three values. The distance value may adopt at least ten or more values. Thus, it can be possible that adjacent values differ in magnitude to only a small extent, whereby the driver can be provided with a continuous or almost continuous adjustment capability for the distance value. The distance value specified by the driver can be 50 cm, for example. The reference line can, for example, be a line that extends along the center of a lane and that is provided by a navigation unit.

From the distance value and the course of the reference line, the control unit can specify the permissible region, wherein in this case it is a corridor along the reference line with a width of 100 cm. The driving path can extend within the permissible area starting from the current transportation vehicle position and can be calculated by a first mathematical optimization method. The first mathematical optimization method can be arranged so that the driving path along the permissible region is optimized to a minimum driving time. Compliance with the permissible region can, for example, be ensured by a boundary condition in the first mathematical optimization method and/or a measure of quality.

A disclosed embodiment provides that an acceleration value of a maximum lateral acceleration is received by the control unit from the input device and a speed profile for the driving path is calculated analytically from the driving path and the acceleration value of the maximum lateral acceleration. The calculation can be carried out according to a specified analytical method. The acceleration value is the maximum permissible value of the lateral acceleration that may arise while driving along the driving path in accordance with the speed profile. The lateral acceleration is the part of the acceleration that acts laterally on the transportation vehicle. The speed profile assigns a respective speed to the driving path, wherein speed values along the driving path that may have been calculated in the first mathematical optimization method are disregarded. In this case, an acceleration value of the maximum lateral acceleration is specified by a user input by the input device. The acceleration value is thus not a value predetermined by the dynamics of the transportation vehicle, but can be adjusted by a user input.

In other words, a speed profile is analytically calculated for the driving path that is calculated in the context of the first optimization method. In this case, the speed profile is calculated from the driving path and the acceleration value of the maximum lateral acceleration. In this case, the value of the maximum lateral acceleration is a value specified by the driver by the input device. This results in the speed profile being determined by analytical computational operations with low computing costs. It is thus possible that the control unit calculates a local value of the speed from a local turn radius of the driving path and the acceleration value.

Another disclosed embodiment provides that an acceleration value of a maximum lateral acceleration is received by the control unit from the input device and a speed profile for the driving path is calculated by a second mathematical optimization method arranged downstream of the first optimization method. The acceleration value is the maximum permissible value of the lateral acceleration that may occur while driving along the driving path in accordance with the speed profile. The lateral acceleration is the part of the acceleration acting laterally on the transportation vehicle. The speed profile assigns a respective speed to the driving path, wherein speed values along the driving path that may have been calculated in the first mathematical optimization method are discarded. The speed profile calculated by the second mathematical optimization method is optimized to a minimum driving time. A difference from the time optimization in the first mathematical optimization method is that the second optimization method comprises a boundary condition that concerns complying with the maximum lateral acceleration, wherein an acceleration value of the maximum lateral acceleration is specified by a user input by the input device. The acceleration value is thus not a value that is predetermined by the dynamics of the transportation vehicle, but is adjusted by a user input.

In other words, a speed profile is calculated for the driving path calculated during the first optimization method. This is carried out by a second optimization method, wherein the speed profile for the driving path is also optimized to a minimum driving time while complying with a permissible maximum lateral acceleration. In this case, the second optimization method is arranged downstream of the first optimization method. The permissible maximum lateral acceleration is specified by a user input into the input device in this case. This results in the driving behavior only being adjusted in relation to the speed by adapting the permissible lateral acceleration. It is thus possible that the user has set a maximum lateral acceleration of, for example, 0.5 g, wherein g is the acceleration due to gravity, in an input device, such as a user interface, whereby a speed profile is calculated by the second mathematical optimization method for the driving path determined in the first optimization method, resulting in a minimum driving time, wherein the maximum lateral acceleration is not exceeded while following the speed profile.

A further disclosed embodiment provides that any mathematical optimization method comprises at least one boundary condition that requires compliance with the dynamics of the transportation vehicle. The dynamics of the transportation vehicle can include inter alia a maximum lateral acceleration, a maximum longitudinal acceleration and the minimum achievable turn radius, each of which can be predetermined by the transportation vehicle. In other words, by using at least one boundary condition in the mathematical optimization method it can be ensured that the dynamics of the transportation vehicle are maintained while travelling along the driving path. This results in the calculated driving path being compatible with the dynamics of the transportation vehicle. Thus, for example, it is possible that a boundary condition of the driving path and the speed profile can be influenced such that a maximum acceleration value of the transportation vehicle in the longitudinal direction is not exceeded.

A disclosed embodiment provides that the distance value of a maximum lateral distance from the predefined reference line is an absolute value. In other words, the distance value describes a fixed distance that is not related to another variable. This results in the distance value having the same magnitude for all sections along the reference line. Thus, it is possible that the distance value constantly has the value 100 cm along the reference line.

Another disclosed embodiment provides that the distance value of a maximum lateral distance from the predefined reference line is a relative value in relation to a lateral distance from the lateral boundary. In other words, the distance value has a ratio to the lateral distance of the reference line from the lateral limit that is selected by the user. This results in the distance value being oriented to the width of a lane. Thus, it is possible that the distance value is a quarter of the distance from the lateral boundary and thus has a larger value on a wide road than on a narrower road.

A further disclosed embodiment provides that the driving path and/or the speed profile is calculated while taking into account local speed limits. In other words, one or both of the optimization methods is arranged such that speed limits prevailing in sub sections of the lane are complied with. This makes it possible to take into account speed limits along the driving path. Thus, it is possible that the speed profile does not exceed a speed of 50 km/h when the driving path passes through a built-up area.

A disclosed embodiment provides that at least the speed profile is calculated while taking into account weather conditions. In other words, boundary conditions of the optimization method are varied depending on a detected weather condition. This results in a hazard to the transportation vehicle because of adverse weather conditions being avoided. Thus, it is possible that the values of the maximum speed, the maximum lateral acceleration and the maximum longitudinal acceleration are dependent on a detected wetness of the road. The functions for calculating the values can also be dependent on the type of road coating. Thus, for example, lower traction of the transportation vehicle on a wet road is taken into account.

The disclosure also includes a device for a transportation vehicle that is arranged to carry out the disclosed method and that comprises a control unit and an input device. In other words, the device comprises a control unit, wherein the control unit can be a microcontroller or a microprocessor that is arranged to carry out the disclosed method. The device also comprises an input device that is arranged to determine a distance value of a maximum lateral distance from the predefined reference line and/or a maximum acceleration value of a maximum lateral acceleration as a function of specified user inputs.

A disclosed embodiment provides that the input device comprises at least one rotary control for inputting each user input. In other words, the input device comprises a rotatable controller with at least three positions. This allows for a user to specify the distance value and the acceleration value by a simple user input. Thus, it is possible, for example, that the rotary control has 100 possible positions, whereby the distance value can be adjusted in increments of one percent between 0 and 100% of the lateral distance between the lane boundary and the reference line.

Another disclosed embodiment provides that the input device comprises a touch sensitive surface for inputting each user input. In other words, the input device enables the user to specify the distance value and the acceleration value by a user input on a touch sensitive surface. This results in the input device not having to comprise a separate mechanical element. Thus, it is possible that the input device does not comprise a separate rotary control but is a touchscreen in a central console of the transportation vehicle.

With the exemplary embodiment, the described components of the embodiment each represent individual features to be mutually independently considered, each of which also develops mutually independently, and are thus also to be viewed individually or other than in the combination shown as components. Furthermore, the described embodiment can also be augmented by further already described features.

In the figures, functionally equivalent elements are each provided with the same reference characters.

FIG. 1 shows a flow chart of a disclosed method. The disclosed method can, for example, be used to adjust a reference line 1 provided by a navigation unit for a driver assistance system while taking into account the transportation vehicle dynamics 2 of a passenger transportation vehicle, so that the reference line 1 can be used as the driving path 3 of an autopilot.

In a first operation, a lane boundary 4 and the predefined reference line 1 can be received by a control unit 5. A lane boundary 4 can represent a boundary that bounds a region that can be traversed, such as, for example, a lane or a road. The lane boundary 4 can also be at a safety distance from an edge of the lane or the road. The lane boundary 4 can coincide with an edge of a lane 6 or can be displaced into the center of the lane 6 by a specified or adjustable safety distance. The reference line 1 can be a line that extends along a center line of the lane 6 and that connects a current transportation vehicle position 7 to a specified destination 8. The lane boundary 4 and the reference line 1 can, for example, be provided by a navigation unit. A driver of the transportation vehicle 9 can specify a maximum lateral distance of a distance value 11 from the predefined reference line 1 in a next operation by a user input into an input device 10. The input device 10 can, for example, comprise a rotary control and/or a slide control and/or a touch sensitive surface. The rotary control and/or the slide control can be embodied as a physical element or as a graphical element on the touch sensitive surface. The distance value 11 can be an absolute value or a relative value, which relates, for example, to a lateral distance of the reference line 1 from the lane boundary 4. The distance value 11 can, for example, be set to at least three different values. The distance value 11 can be received by the control unit 5. The control unit 5 can specify a permissible area 12 that can extend along the reference line 1 and that can be laterally bounded by a lateral boundary 13. In this case, the lateral boundary 13 can be at a lateral distance from the reference line 1 that coincides with the distance value 11. The lateral boundary 13 can differ from the lane boundary 4. The permissible area 12 can be the region in which the driving path 3 can extend.

The driving path 3 for the transportation vehicle 9 can be calculated by the control unit 5 by a specified first mathematical optimization method 14. In this case, the driving path 3 can have a current transportation vehicle position 7 as an initial condition and a predefined destination 8 as an end condition. The first mathematical optimization method 14 can be designed to optimize the course of the driving path 3 for a maximum speed at a minimum driving time. The course of the driving path 3 within the permissible area 12 can be ensured by a boundary condition. The first mathematical optimization method 14 can also have a boundary condition that ensures compliance with the transportation vehicle dynamics 2 of the transportation vehicle 9 when travelling along the driving path 3. In a further operation, an acceleration value 16 of a maximum lateral acceleration can be specified by a user input into the input device 10. The acceleration value 16 and the driving path 3 can be used by the control unit 5 in a second mathematical optimization method 15 or an analytical calculation to calculate a speed profile 17 for the transportation vehicle 9 along the driving path 3.

In the second mathematical optimization method, the speed profile 17 along the driving path 3 can be optimized for a minimum driving time while maintaining the acceleration value 16. One or both of the mathematical optimization methods 14,15 can have boundary conditions that can result in compliance with a section-wise speed limit. One or both of the mathematical optimization methods 14,15 can have boundary conditions that can be a function of the weather conditions. Thus, it is possible that the lateral acceleration or the speed can be reduced in the event of high humidity. For example, the calculated driving path 3 and the calculated speed profile 17 can be provided by the control unit 5 for an autopilot that can navigate the transportation vehicle 9 along the calculated driving path 3.

Figure 2:
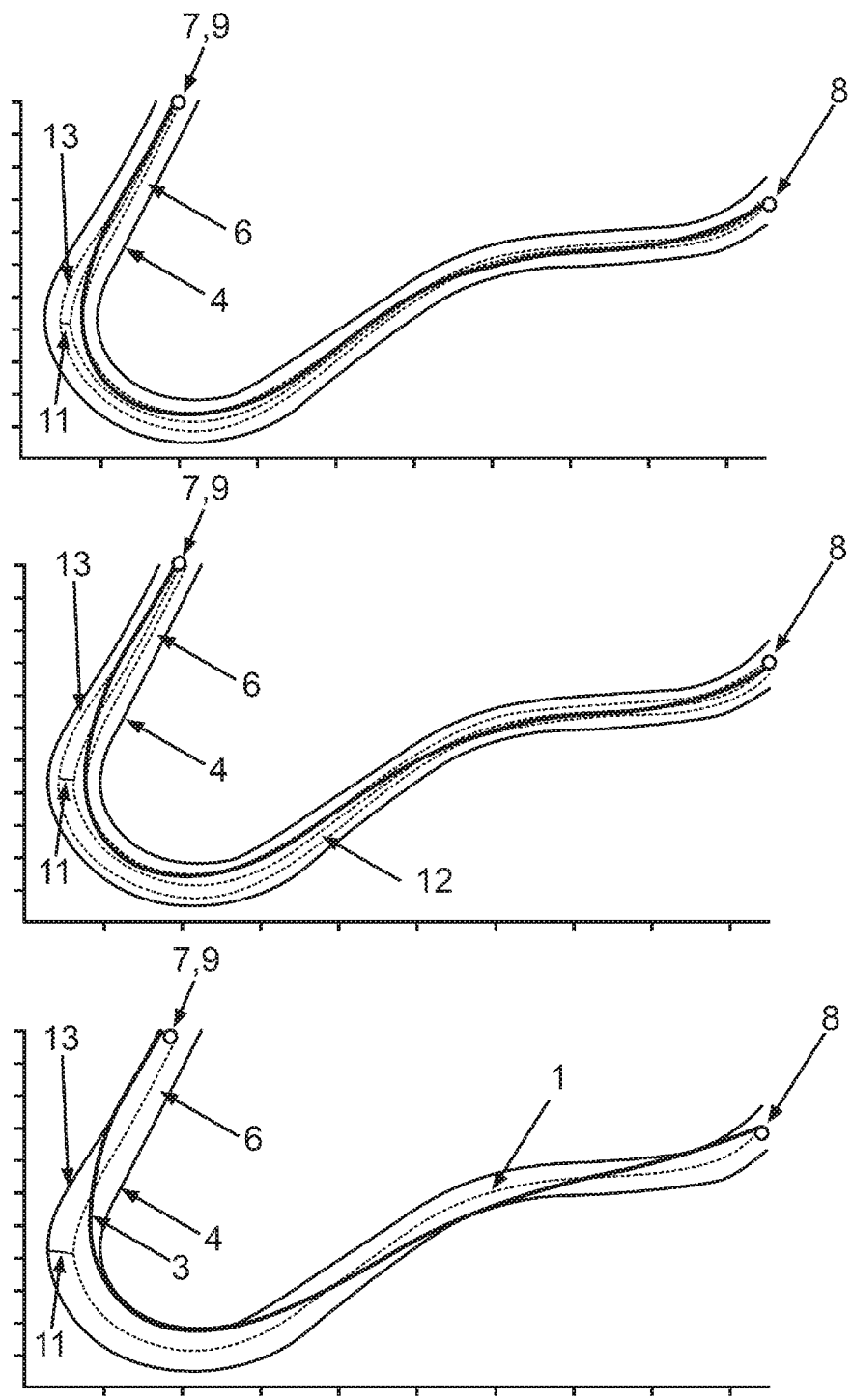
FIG. 2 shows three possible courses of a driving path in a section of a turn depending on the selected distance value

FIG. 2 shows three possible courses of a driving path 3 in a section of a turn depending on the selected distance value 11. The driver of the transportation vehicle can specify the course of the driving path 3 by selecting the distance value 11 in the input device 10. In this case, a driving path 3 with a greater distance value 11 can have a course that uses the transportation vehicle dynamics 2 of the transportation vehicle 9 to a greater extent than a driving path 3 with a lesser distance value 11. This can be desired, for example, if the driver desires a driving style that is perceived to be sporty. A smaller distance value 11 combined with an acceleration value 16 in the lower possible region can by contrast be desirable for a loaded truck, for example. The driving path 3 can be calculated in each case by the disclosed method. The figure shows the course of a lane 6 that can be bounded by a lane boundary 4. A reference line 1 that can be at a lateral distance from the lane boundary 4 can extend in the center of the lane 6. On both sides of the reference line 1 there is a lateral boundary 13 that is at a lateral distance from the reference line 1 that can be specified by the distance value 11. The distance value 11 can have different values in each of the three figures. The respective distance value 11 can be a relative value that can be, for example, 50%, 75% or 100% of the distance of the reference line 1 from the lane boundary 4. The distance value 11 can also be an absolute value and, for example, can be 50 cm. A permissible area 12 in which the respective driving path 3 can extend can be bounded by the lateral boundary 13. The driving path 3 can have a course that is optimized for a driving time by a first mathematical optimization method 14.

Overall, the example shows how a possibility is provided that enables a driver to adapt a reference line 1 according to easily comprehensible parameters.

REFERENCE CHARACTER LIST 1 reference line
2 dynamics of the transportation vehicle
3 driving path
4 lane boundary
5 control unit
6 lane
7 transportation vehicle position
8 destination
9 transportation vehicle
10 input device
11 distance value
12 permissible area
13 lateral limit
14 first mathematical optimization method
15 second mathematical optimization method
16 acceleration value
17 speed profile

The invention claimed is:

1. A transportation vehicle device for adapting a predefined reference line for the transportation vehicle, wherein the device comprises:
   a control unit; and
   a user input device, and
   wherein the adaption comprises:
   receiving the predefined reference line by the control unit in the transportation vehicle;
   receiving a distance value of a maximum lateral distance from the predefined reference line by the control unit from the user input device in the transportation vehicle;
   specifying, by the control unit, a permissible area that extends along the reference line, wherein the lateral boundary of permissible area is at a maximum distance from the reference line;
   calculating a driving path for the transportation vehicle, by the control unit, using a first specified mathematical optimization method, wherein a current transportation vehicle position is used in the first mathematical optimization method as an initial condition; and
   optimizing the driving path for a minimum driving time starting from the current transportation vehicle position using the first mathematical optimization method, wherein the first mathematical optimization method has at least one boundary condition that requires a course of the driving path within the permissible area, wherein the distance value is specified by a user input by the user input device,
   wherein:
     an acceleration value of a maximum lateral acceleration is received by the control unit from the input device;
     a speed profile for the driving path is calculated by a second mathematical optimization method arranged downstream of the first mathematical optimization method;
     the speed profile is optimized for a minimum driving time by the second mathematical optimization method; and
     the second mathematical optimization method has a boundary condition that concerns maintaining the acceleration value,
   wherein the acceleration value of the maximum lateral acceleration is specified by a further user input by the input device, and
   wherein the first mathematical optimization method and the second mathematical optimization method are configured to optimize the driving path for a predetermined speed of the transportation vehicle and a predetermined time of travel.

2. The device of claim 1, wherein the user input device comprises at least one rotary control for inputting user inputs.

3. The device of claim 1, wherein the user input device comprises a touch sensitive surface for inputting user inputs.

4. The device of claim 1, wherein each mathematical optimization method has at least one boundary condition that requires compliance with the dynamics of the transportation vehicle.

5. The device of claim 1, wherein the distance value of the maximum lateral distance from the predefined reference line is an absolute value.

6. The device of claim 1, wherein the distance value of the maximum lateral distance from the predefined reference line is a relative value in relation to a lateral distance from the lateral boundary.

7. The device of claim 1, wherein the first mathematical optimization method has at least one boundary condition that requires compliance with a lane boundary.

8. The device of claim 1, wherein the driving path and/or the speed profile is calculated while taking local speed limits into account.

9. The device of claim 1, wherein at least the driving path is calculated while taking weather conditions into account.

10. A method for adapting a predefined reference line for a transportation vehicle, wherein the method comprises:
- receiving the predefined reference line by a control unit in the transportation vehicle;
- receiving a distance value of a maximum lateral distance from the predefined reference line by the control unit from a user input device in the transportation vehicle;
- specifying, by the control unit, a permissible area that extends along the reference line, wherein the lateral boundary of permissible area is at a maximum distance from the reference line;
- calculating a driving path for the transportation vehicle, by the control unit, using a first specified mathematical optimization method, wherein a current transportation vehicle position is used in the first mathematical optimization method as an initial condition; and
- optimizing the driving path for a minimum driving time starting from the current transportation vehicle position using the first mathematical optimization method, wherein the first mathematical optimization method has at least one boundary condition that requires a course of the driving path within the permissible area, wherein the distance value is specified by a user input by the user input device, wherein:
- an acceleration value of a maximum lateral acceleration is received by the control unit from the input device;
- a speed profile for the driving path is calculated by a second mathematical optimization method arranged downstream of the first mathematical optimization method;
- the speed profile is optimized for a minimum driving time by the second mathematical optimization method; and
- the second mathematical optimization method has a boundary condition that concerns maintaining the acceleration value, wherein the acceleration value of the maximum lateral acceleration is specified by a further user input by the input device, and wherein the first mathematical optimization method and the second mathematical optimization method are configured to optimize the driving path for a predetermined speed of the transportation vehicle and a predetermined time of travel.

11. The method of claim 10, wherein each mathematical optimization method has at least one boundary condition that requires compliance with the dynamics of the transportation vehicle.

12. The method of claim 10, wherein the distance value of the maximum lateral distance from the predefined reference line is an absolute value.

13. The method of claim 10, wherein the distance value of the maximum lateral distance from the predefined reference line is a relative value in relation to a lateral distance from the lateral boundary.

14. The method of claim 10, wherein the first mathematical optimization method has at least one boundary condition that requires compliance with a lane boundary.

15. The method of claim 10, wherein the driving path and/or the speed profile is calculated while taking local speed limits into account.

16. The method of claim 10, wherein at least the driving path is calculated while taking weather conditions into account.

* * * * *